No. 791,592. PATENTED JUNE 6, 1905.
J. A. SWINEHART.
RUBBER TIRE.
APPLICATION FILED OCT. 8, 1904.
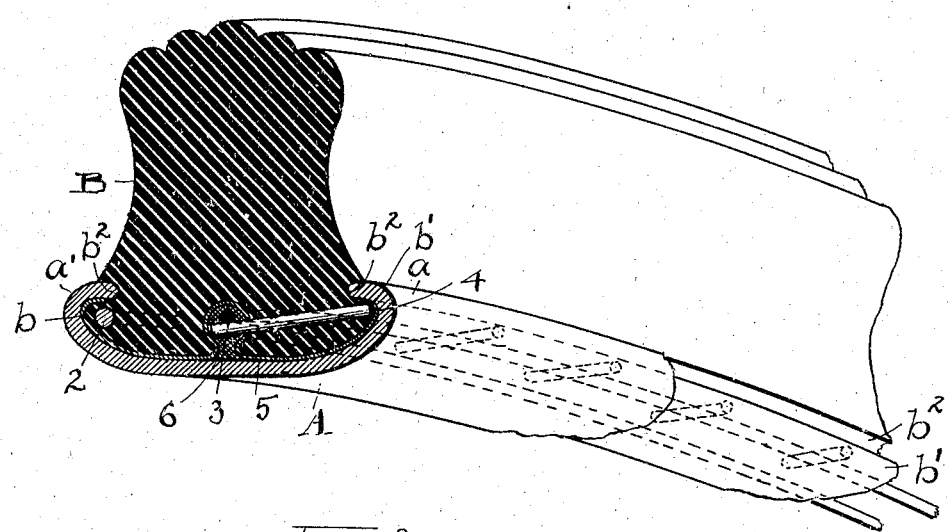
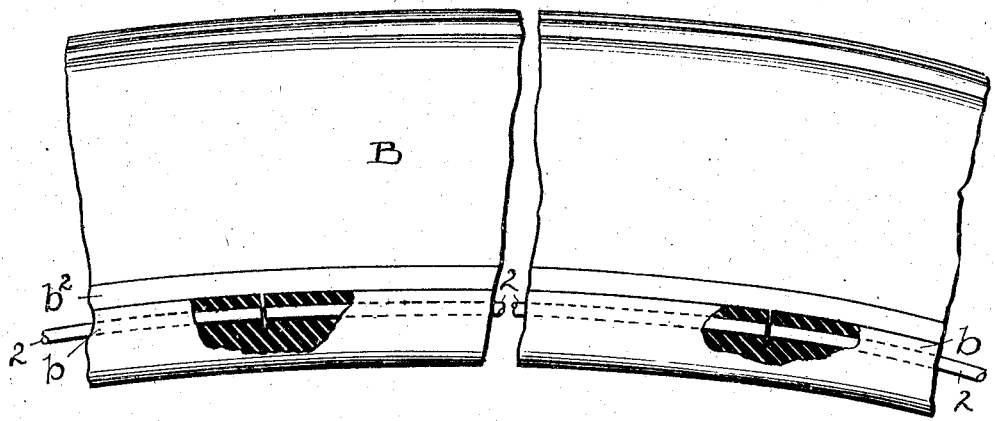
WITNESSES:
INVENTOR.
James Allen Swinehart
BY H. J. Fisher
ATTORNEY.

No. 791,592. Patented June 6, 1905.

UNITED STATES PATENT OFFICE.

JAMES ALLEN SWINEHART, OF AKRON, OHIO.

RUBBER TIRE.

SPECIFICATION forming part of Letters Patent No. 791,592, dated June 6, 1905.

Application filed October 8, 1904. Serial No. 227,685.

*To all whom it may concern:*

Be it known that I, JAMES ALLEN SWINEHART, a citizen of the United States, residing at Akron, in the county of Summit and State of Ohio, have invented certain new and useful Improvements in Rubber-Tired Vehicles; and I do declare that the following is a full, clear, and exact description of the invention, which will enable others skilled in the art to which it appertains to make and use the same.

My invention relates to improvements in rubber-tired vehicles; and the invention consists in a tire having a so-called "clencher-rim" and a solid rubber tire secured therein by novel means, as hereinafter fully described, and particularly pointed out in the claims.

In the accompanying drawings, Figure 1 is a perspective view of a portion of a tire embracing my invention, and Fig. 2 is a side elevation thereof.

As thus shown, the invention comprises a so-called "clencher-rim" A, a solid rubber tire B, and means to so effectually engage the tire with the rim as to withstand all possible strains that may come thereon by reason of short turns, heavy loads, or through other severe tests accidentally or otherwise.

The rim A is of metal and has two clencher edges or flanges $a$ and $a'$ about its periphery, formed by first turning the said edges outward from the body of the rim as compared with the axis of the wheel and then turning the said edges inward toward each other, thus leaving an open space directly beneath each edge or flange to the base of the tire and narrowing the cross-sectional area between the said edges relatively as shown where the said edges enter the tire.

The tire B is provided with continuous grooves or channels $b^2$ along each side at its base, which are engaged by the said inturned clencher flanges or edges $a$ and $a'$ of the rim, and this produces ribs, beads, or flanges $b$ $b'$ at the edges of the base of the tire, which are locked beneath the said clencher-rims $a$ and $a'$. Other and additional features or parts for securing the said tire are the continuous wire 2 in the side rib $b$ in the base of the tire and the continuous wire 3, centrally in the base of the tire, the cross bars or rods 4, engaging said wire 3, the fabric lining 5 on the bottom of the tire, and the cement channel 6 in the base and center of the tire.

The annular cement groove or channel 6 is designed to be filled with a cement which will harden and become perfectly solid, but when first placed in the tire is comparatively soft and pliable, and the endless wire 3 is embedded in the bottom of channel 6, and the cross-bars 4 are engaged beneath the same at one end, while the other ends of said bars extend through side rib $b'$ of the base and engage beneath the flange $a$. Thus it occurs that said transverse bars, rods, or wires 4 extend halfway through the base of the tire, and there are none on the other side of the tire which carries the stiffener-wire 2.

The fabric or lining 5 is adhered to both the tire and the rim and practically unifies said parts, because the adhesion is of a very tenacious kind, and the wire 2 is cured in the tire and lies well in beneath the clencher edge $a'$ when in use; but the said wire or like reinforcing or stiffener 2, whatever it may be and whether of wire or its equivalent, is subsequently cut into such lengths as will enable the tire to stretch when it is being placed on the rim. This cutting or severing of the wire at intervals is done after the tire is removed from the mold.

When the tire is placed on the rim, engagement is first made on its flange or base side $b'$ beneath rim or flange $a$ and afterward on its base side $b$ beneath flange $a'$. This latter work is proceeded with progressively from one cross-bar to the other and while the cement in channel 6 is still plastic or pliable, working the edge of the tire under rim $a'$ as the work progresses. The inner ends of the bars or rods 4 are embedded in the cement in said channel and usually are located about an inch apart. Hence only about an inch of this side of the tire is worked in beneath flanges $a$ at a time, and as said channel 6 expands after successive compressions and expansions of the tire to crowd the tire to place and its subsequent relaxation the cement flows in to fill the vacuum and completely fills said channel, as shown in Fig. 1.

The stiffening member or wire 2 in edge or rib *b* of the base of tire remains continuous though not in one piece after being severed at intervals, as the ends abut and the continuity of the wire as a stiffener really is not broken, so far as its service or usefulness are concerned. This is so because the wire is intended to stiffen the tire at this side, so that it cannot be pulled out from beneath the clencher-flange, and the short space within which strain comes in actual use is the space immediately in contact with the road and is sustaining the weight, and this is shorter than the lengths of any of the wire pieces 2. Obviously the effect would be the same if several wire pieces 2 were used originally rather than one which is cut in pieces.

What I claim is—

1. In vehicle-tires, a solid rubber tire having a succession of short wire pieces embedded end to end in one side of the base thereof, said pieces disconnected from other parts of the wheel and cured in the rubber, and cross-braces in the opposite edge of said tire extending part way through the base of the tire.

2. A solid rubber tire having a stiffener embedded in one edge of the base thereof and a succession of bars embedded transversely in the opposite edge of said base and terminating in the middle of the tire, substantially as described.

3. A solid rubber tire having a central channel in its base filled with a self-hardening cement and transverse bars embedded at one end in said cement and terminating at the other end at the edge of said base, and a wire stiffener running continuously through the other edge of the base, substantially as described.

4. A solid rubber tire having a continuous cement-filled channel in its base and a continuous wire embedded in said channel, fabric cemented to the bottom of said tire and transverse bars engaged beneath said wire at one end and in one edge of the tire at the other, and a continuous stiffener in the other edge of said tire, substantially as described.

5. The combination of the clencher-rim with the tire having a continuous stiffener in one edge thereof and a series of transverse bars in the opposite edge thereof, said bars terminating in the middle of the base of the tire, substantially as described.

6. The combination of the clencher-rim with the solid rubber tire having a continuous stiffener in one edge of its base, a succession of transverse braces in the other edge and provided with a cement-filled channel in its middle in which said braces terminate, a continuous wire in the bottom of said channel and a fabric lining about said base adhered to both said rim and tire, substantially as described.

In testimony whereof I sign this specification in the presence of two witnesses.

JAMES ALLEN SWINEHART.

Witnesses:
H. T. FISHER,
C. A. SELL.